United States Patent
Lallemant et al.

(10) Patent No.: US 9,938,938 B2
(45) Date of Patent: Apr. 10, 2018

(54) DISTRIBUTOR HAVING TWO CHANNELS AND A SINGLE MOTOR OPERATING IN A SINGLE DIRECTION

(71) Applicant: Valeo Systemes de Controle Moteur, Cergy Saint Christophe (FR)

(72) Inventors: Mathieu Lallemant, Maisons-Laffitte (FR); Franck Girardon, Conflans Sainte Honorine (FR); Patrick Lebrasseur, Montagny en Vexin (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 649 days.

(21) Appl. No.: 14/366,951

(22) PCT Filed: Dec. 11, 2012

(86) PCT No.: PCT/FR2012/052879
§ 371 (c)(1),
(2) Date: Jun. 19, 2014

(87) PCT Pub. No.: WO2013/093290
PCT Pub. Date: Jun. 27, 2013

(65) Prior Publication Data
US 2015/0000626 A1    Jan. 1, 2015

(30) Foreign Application Priority Data
Dec. 21, 2011  (FR) ...................................... 11 62180

(51) Int. Cl.
*F02M 35/00* (2006.01)
*F02M 35/10* (2006.01)
(Continued)

(52) U.S. Cl.
CPC ... *F02M 35/10091* (2013.01); *F02B 29/0418* (2013.01); *F02M 26/26* (2016.02);
(Continued)

(58) Field of Classification Search
CPC ....... F02M 35/10091; F02M 35/10111; F02M 35/10144; F02M 26/26; F02M 26/71; F02B 29/0418
See application file for complete search history.

(56) References Cited

U.S. PATENT DOCUMENTS

2009/0050830 A1 * 2/2009 Albert ................. F02B 29/0418
251/129.11

FOREIGN PATENT DOCUMENTS

DE    4401559 C1    5/1995
FR    2 900 455 A1    11/2007
(Continued)

OTHER PUBLICATIONS

International Search Report issued in PCT/FR2012/052879 dated Feb. 25, 2013 (4 pages).

*Primary Examiner* — Kevin A Lathers
(74) *Attorney, Agent, or Firm* — Osha Liang LLP

(57) ABSTRACT

The invention relates to a double distributor for distributing the intake fluid of an internal combustion engine and controlling the temperature thereof, comprising a body (1) in which first and second channels for circulating said intake fluid are arranged, first (10) and second (20) shutters being positioned in said channels in order to distribute the flow passing through said channels, said distributor also including a motor (9) for actuating said shutters and kinematics simultaneously actuating the first and second shutters according to a movement law in response to an actuation of said motor, said kinematics comprising an inactive position in which said shutters are positioned when no force is supplied by said actuator motor, characterized in that said kinematics are configured such that said shutters can strictly follow said movement law when actuated by the motor from said inactive position without returning to said position.

12 Claims, 5 Drawing Sheets

Figure 1:
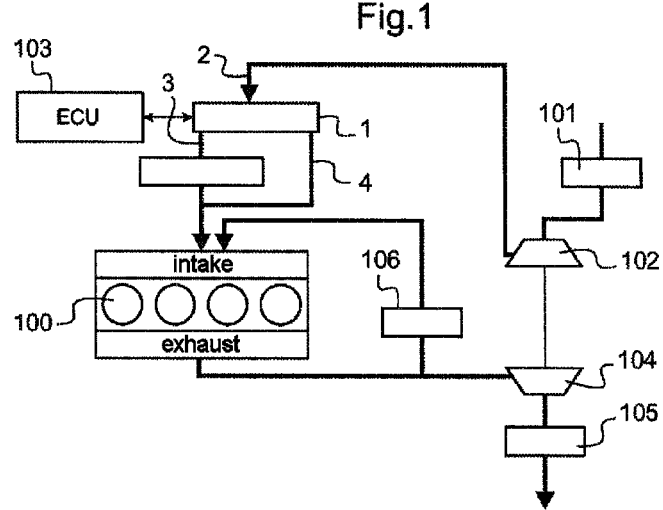

(51) Int. Cl.
*F02B 29/04* (2006.01)
*F02M 26/26* (2016.01)
*F02M 26/71* (2016.01)
*F02D 9/02* (2006.01)

(52) U.S. Cl.
CPC ..... *F02M 26/71* (2016.02); *F02D 2009/0277* (2013.01); *F02D 2009/0279* (2013.01); *Y02T 10/146* (2013.01)

(56) References Cited

FOREIGN PATENT DOCUMENTS

| FR | 2 926 126 A1 | 7/2009 |
|---|---|---|
| WO | 2007/125205 A1 | 11/2007 |

\* cited by examiner

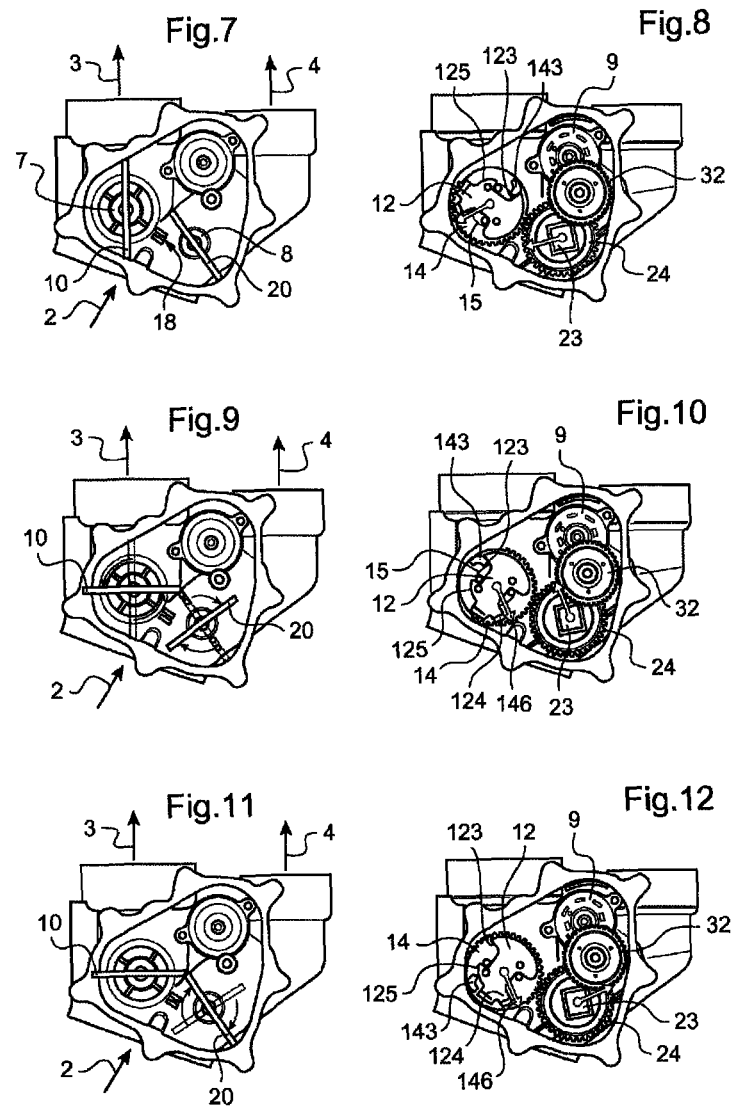

DISTRIBUTOR HAVING TWO CHANNELS AND A SINGLE MOTOR OPERATING IN A SINGLE DIRECTION

The field of the present invention is that of automobiles and, more particularly, that of equipment for feeding the engine of a vehicle.

A motor vehicle internal combustion engine comprises a combustion chamber, generally formed by a plurality of cylinders, in which a mixture of fuel and air is burned to generate the work of the engine. Architectures in which the flow of intake fluid, comprising the air necessary for the operation of the engine, is divided between two lines are known. One of the lines bears a device for cooling this fluid, whereas the other does not have one. These two lines then meet up at the intake of the engine. The distributing device can thus vary the temperature of the intake fluid before it is introduced into the cylinders according to whether more fluid is sent via the channel which passes through the cooler, termed cooled channel, or via the channel which runs around it, termed bypass channel or noncooled channel. The distributing device makes it possible in this way to manage both the quantity of the fluid let into the cylinders and the temperature thereof.

In the prior art, this distributing device was initially produced in the form of two single distributors which receive setpoints from the engine electronic control unit and which open to a greater or lesser extent their shutter with the aid of an actuator servo-controlled in position. These distributors also have the function, upon a specific control, of shutting down the engine, by positioning their shutters in the fully closed position, which chokes the engine. In their inactive position, that is to say the position adopted by the shutters in the event of malfunction of the servo-control or in the absence of receiving a setpoint, said shutters are placed automatically, under the effect of a return spring, in the open position. These devices have the disadvantages of using two components, of requiring two servo-control systems with the associated connections, which substantially increases their cost, and of complexifying the distribution control system to guarantee the simultaneous action of the two distributors.

A first improvement has been provided with the creation of double distributors which combine in one and the same component the two shutters and the control for positioning them. Such a device is described in patent application WO 2007125205 or FR 2 900 455 of the applicant, which shows a double distributor of which the mechanism is actuated by a common actuating motor. In the application, in normal operation, one of the shutters distributes the intake fluid, the second shutter remaining closed; in a secondary mode, the first shutter is closed while the second shutter remains fully open.

However, the kinematics associated with this double distributor have the disadvantage that they require the rotation of the actuating motor in one direction and in the other according to the desired distribution configuration. This results in increased technological complexity.

The object of the present invention is to overcome these disadvantages by proposing a double distributor having kinematics which make it possible to follow the desired movement law, such as a proportional distribution on the two channels and/or a distribution on only one channel, by actuating the actuating motor only in a single direction.

Accordingly, the subject of the invention is a double distributor for distributing of the intake fluid of an internal combustion engine and controlling the temperature thereof, comprising a body in which a first and a second channel for circulating said intake fluid are arranged, first and second shutters being positioned in said channels in order to distribute the flow passing through said channels, said distributor additionally comprising a motor for actuating said shutters and kinematics simultaneously actuating the first shutter and the second shutter according to a movement law in response to an actuation of said motor, said kinematics comprising an inactive position in which said shutters are positioned when no force is provided by said actuating motor. According to the invention, said kinematics are configured such that said shutters can follow the whole of said movement law under the action of the motor from said inactive position without returning to said position.

The actuating motor, which is advantageously an electric motor, can thus be actuated in a single direction, thereby allowing it to be controlled in an extremely simple manner. Specifically, it is possible to describe the whole of the movement law of the shutters without reversal of the direction of the polarity applied to the motor, by contrast, for example, to what is described in application FR 2 900 455.

Said shutters are, for example, rotatable. The force provided by the motor to drive them via said kinematics can then be a torque. The axis of rotation of the first shutter can be parallel to the axis of rotation of the second shutter.

The kinematics can make it possible that:
  in one phase of the movement law, the movement of the motor is simultaneously transmitted to the first and to the second shutter, and
  in another phase of the movement law, the movement of the motor is transmitted to only one shutter, the other shutter remaining immobile.

When the movement of the motor is simultaneously transmitted to the first and to the second shutter, there is no phase shift for example between the movement of the first shutter and the movement of the second shutter, by contrast with what is taught by application FR 2 926 126.

Advantageously, the kinematics are configured to ensure, in response to a first control of the actuating motor, a proportional distribution on the two outlet channels by simultaneous rotation of the two shutters, an increase in the flow on one of the output channels being associated with a decrease in the flow on the other, during a first phase of said movement law.

In one particular embodiment, the kinematics are configured to ensure a constant total flow during said proportional distribution.

Preferably, the kinematics are configured to ensure, in response to a second control of the actuating motor consecutive to a closure of said first shutter and an opening of said second shutter resulting from said first control, the distribution of the flow passing through the second outlet channel by a rotation of the second shutter, the first shutter remaining closed, during a second phase of said movement law.

More preferably, the kinematics are configured to bring the second shutter, in response to the second control, into a fully closed position corresponding to said shutter being turned 180° compared to its closed position when in the inactive position.

As explained above, the first control of the actuating motor can correspond to a rotation of the latter in a first direction of rotation and over a first angular value, and the second control of the actuating motor can correspond to a rotation of the actuating motor in the first direction of rotation and over a second angular value. The rotation of the actuating motor according to the second control can thus be carried out in the same direction as that according to the first control.

Advantageously, the kinematics are configured to position the shutters in opposition to the action of two return springs, a first spring remaining prestressed during the first phase of the movement law in order to transmit the force of the motor to a first of said shutters and being subjected to a stress, under the action of said motor, during the second phase of said movement law, the second spring being subjected to a stress, under the action of said motor, at least during the first phase, in particular during the two phases, of said movement law.

More advantageously, the actuating motor drives a first toothed wheel bearing a drive finger configured to rotate the first shutter, via said first return spring.

More advantageously still, one of the ends of said first return spring is fixed to a first plate rigidly connected to the shaft of the corresponding shutter, the other end being fixed to said first toothed wheel.

Preferably, the actuating motor drives, via a drive pinion, two toothed wheels meshing with one another, said first plate comprising a dead range in its cooperation with the drive finger and said dead range corresponding to the actuation of only the second shutter by the actuating motor, the first shutter remaining immobile.

The invention also relates to an air intake module for an internal combustion engine comprising a double distributor as described above.

The first circulation channel of the distributor is, for example, connected to a cooler of the intake module while the second circulation channel short-circuits this cooler, in particular with the aim of meeting up directly with the intake pipes. In the inactive position, the first shutter can be open, that is to say allow the circulation of the intake fluid toward the cooler, while the second shutter can be closed, preventing short-circuiting of the cooler by the intake fluid.

The invention will be better understood and other aims, details, features and advantages thereof will become more clearly apparent from the following detailed explanatory description of an embodiment of the invention given by way of purely illustrative and nonlimiting example, with reference to the appended schematic drawings.

Figure 2:
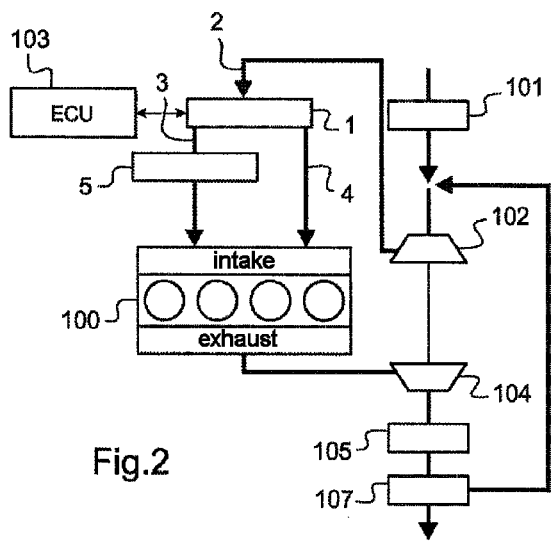
Figure 3:
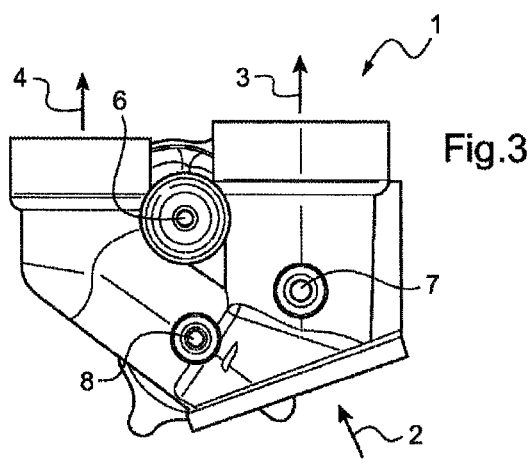
Figure 5:
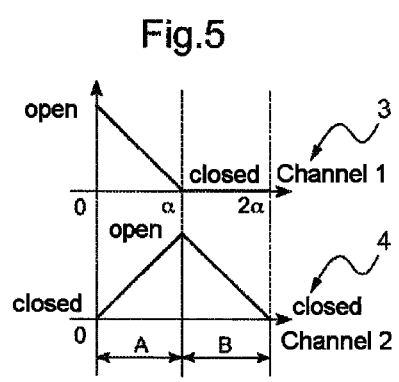
Figure 6:
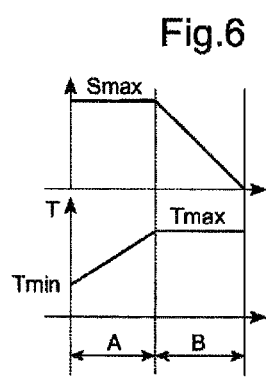
Figure 4:
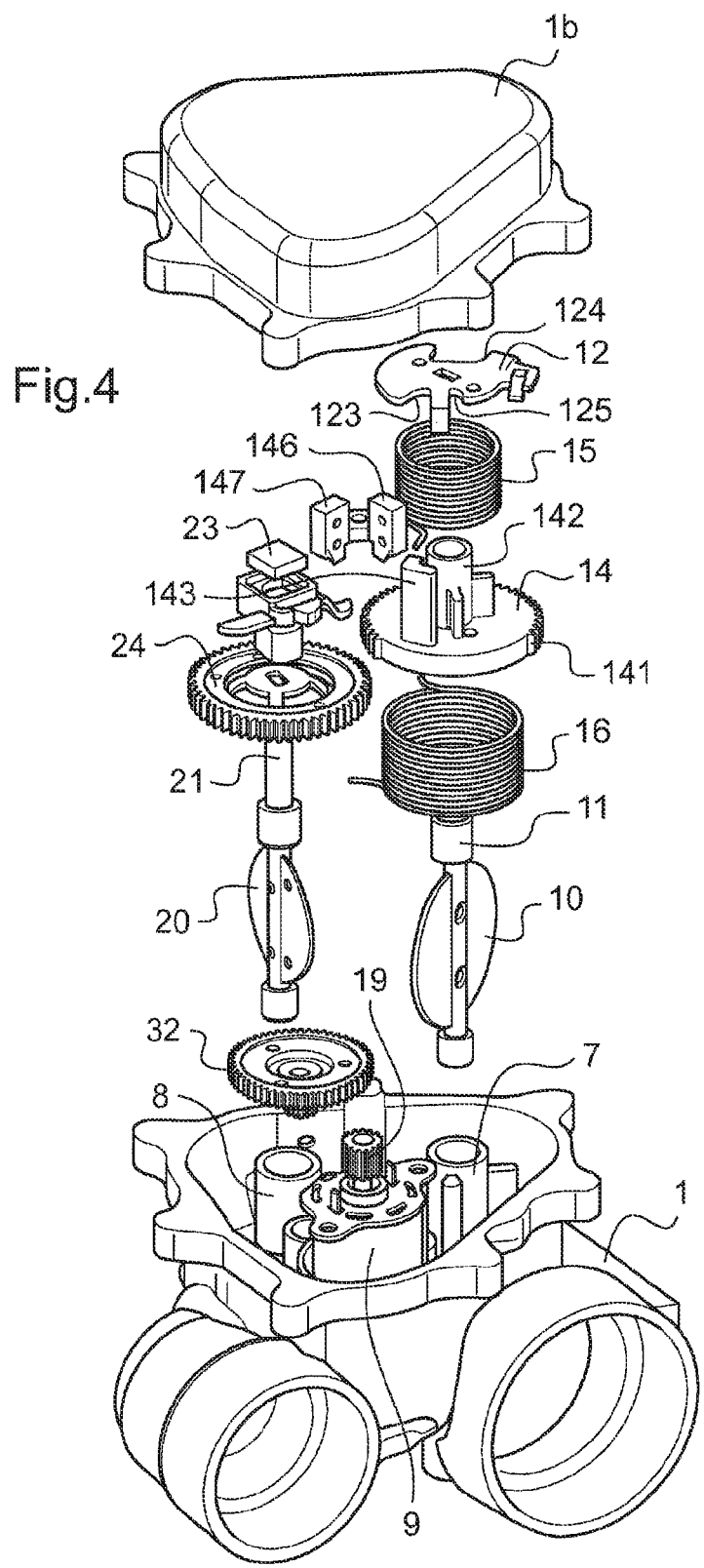
Figure 13:
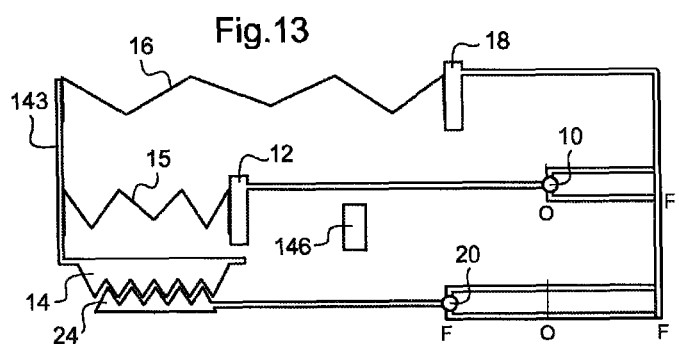
Figure 14:
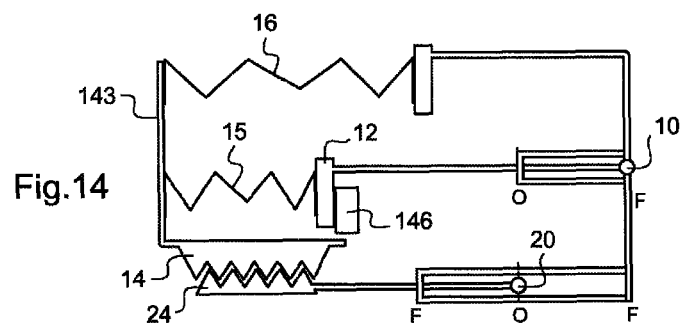
Figure 15:
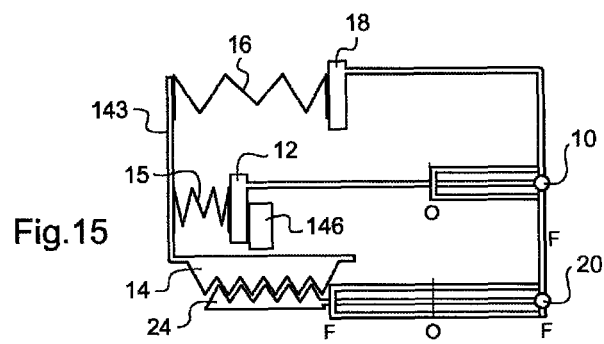

In these drawings:

FIG. 1 is a schematic view of a high-pressure architecture for feeding a turbocharged vehicle engine, FIG. 2 is a schematic view of a low-pressure architecture for feeding a turbocharged engine, FIG. 3 is a front view of a double distributor, according to the invention, for the feed circuit of a turbocharged engine, FIG. 4 is an exploded view, in perspective, of a distributor according to the invention and of its control device, FIG. 5 is a representation of a movement law for the shutters giving their degree of opening on each of the channels, as a function of the angular position of the toothed drive wheel, during its actuation by the single motor of the double distributor, FIG. 6 is a representation of the change in the effective cross section of the double distributor for the passage of the fluid which passes through it, and in the temperature of this fluid, according to the position given to the shutters by the actuating motor of the double distributor, FIGS. 7 and 8 are plan views of the double distributor of FIG. 4 respectively showing the shutters and their control kinematics, in the inactive position, which also corresponds to the initial position of the travel of the actuating motor, FIGS. 9 and 10 are plan views of the double distributor of FIG. 4 respectively showing the shutters and their control kinematics, in the median position of the travel of the actuating motor, FIGS. 11 and 12 are plan views of the double distributor of FIG. 4 respectively showing the shutters and their control kinematics, in the final position of the travel of the actuating motor, FIGS. 13 to 15 are schematic views, according to a linear representation, of the relative position of the elements of the kinematics of the double distributor, respectively in the initial, median and final positions of the travel of the actuating motor.

With reference to FIG. 1, there can be seen the circuit for feeding air to the cylinders 100 of a turbocharged internal combustion engine for a motor vehicle. The air, taken from outside, passes through an air filter 101 and is then compressed by the compressor 102 of the turbocharger which sends it into the double distributor, the subject of the invention. The body 1 of this double distributor has an inlet channel 2 through which passes the air coming from the compressor and two outlet channels 3 and 4. It receives orders for distributing the air between these two channels from a computer 103, termed electronic control unit (ECU). These orders are executed in the form of a movement of the shutters which close the channels 3 and 4 to a greater or lesser degree under the action of an electric actuating motor and of suitable kinematics, which are integrated into the body of the double distributor. On one of the channels, termed cooled channel 3, there is mounted a heat exchanger or cooler 5, while the other channel, termed bypass channel or noncooled channel 4, is connected directly to the intake pipes of the engine of the vehicle. By varying the distribution of the air between the two channels, which meet up upstream of the intake pipes, it is thus possible to regulate the temperature at the intake of the engine.

On leaving the cylinders of the engine, the burnt gases are directed toward the exhaust circuit and pass through the turbine 104 of the turbocharger which taps off part of their residual energy to actuate the corresponding compressor 102. These exhaust gases then pass conventionally through a particle filter and/or a catalytic converter 105 before being ejected from the vehicle.

In the case of a high-pressure architecture, as is represented in FIG. 1, part of the exhaust gases is recycled, via a high-pressure valve 106 situated upstream of the turbine 104, into the intake circuit downstream of the junction of the two outlet channels 3 and 4.

In the case of a low-pressure architecture, as is represented in FIG. 2, there can be found the same elements as in a high-pressure architecture, with the exception that the recycled part of the exhaust gases is tapped off downstream of the turbine 104 and reinjected, via a low-pressure valve 107, upstream of the compressor 102 of the turbocharger. The fluid which circulates in the intake circuit is then not only air but a mixture of air and of exhaust gas. However, the operation of the double distributor remains the same in both architectures.

Referring now to FIG. 3, there can be seen the body 1 of a double distributor, with the inlet channel 2 and the two outlet channels 3 and 4. The first outlet channel 3 is intended to be connected to a cooler 5 while the second channel 4 is intended to short-circuit this cooler to meet up directly with the intake pipes. A distribution on each of the two channels 3 and 4 takes place by means of a shutter, movable here about a shaft which is mounted on a shaft support, 7 in the case of the first shutter and 8 in the case of the second. The distribution on each channel is effected by the rotation of the shutter, which obstructs to a greater or lesser extent the flow of air or gas which passes through the corresponding channel according to a movement law for the shutters. The body 1 may also comprise a support 6 for the electric motor for actuating the two shutters, to which the latter are connected by suitable kinematics. The electric actuating motor 9 receives setpoints from the ECU 103 in order to place the shutters in the desired position, according to said movement law for the shutters.

FIG. 4 shows in exploded view a double distributor with the elements which constitute it, enclosed in the body 1 by its cover 1b.

The electric motor 9 actuates, via its pivot shaft 19, an intermediate toothed wheel 32 which cooperates with a second toothed wheel 24 belonging to the second channel 4, itself cooperating with a first toothed wheel 14 belonging to the first channel 3. These first and second toothed wheels are free to rotate about their axis and form, in the kinematics of the double distributor, the members which actuate, directly or indirectly, the first and second shutters of the two channels.

The device for controlling the first channel 3, presented here as the cooled channel, comprises a first shutter 10, mounted on a shaft 11, of which the lower end is intended to rotate in the shaft support 7 of the body of the distributor. The shutter is thus able to rotate with respect to the body 1. The upper end, for its part, bears a first coaxial upper plate 12, to which it is fixed rigidly such that a rotation of this upper plate triggers a rotation of the same amplitude of the shutter 10. Moreover, the shaft 11 bears, via a bearing, the first toothed wheel 14, which is free to rotate about this shaft, and which acts on the plate 12 in order to turn the first shutter 10, according to a principle which will be explained hereinbelow.

The toothed wheel 14 has the form of a disk having teeth over the major part of the circumference of its outer face 141, so as to be able to be rotated by the corresponding circumference of the second toothed wheel 24. At its center it comprises a cylindrical tube 142, extending axially, which forms a bearing for the shaft 11 of the first shutter 10 for distributing the first channel flow. Finally, at its periphery, the toothed wheel comprises a drive finger 143 which extends axially and which cooperates with a first stop 123, arranged on the periphery of the first plate 12. To drive the first shutter 10 and to contribute to its return and to position the shutter in an inactive position in which it is fully open, a first spring 15 is positioned between the first toothed wheel 14 and the first plate 12. The ends of said spring are inserted into notches made at the periphery of the two parts so as to ensure that the first plate 12 is returned rotationally in the direction of said inactive position. Moreover, a fixed first channel stop 146 is installed on the body 1 of the double distributor in order to limit the rotation of the first plate 12, by cooperation of this first fixed stop with a protuberance 124 positioned on the periphery of the plate. The first plate 12 additionally has a dead range 125 allowing the compression of the first spring 15 by virtue of the rotation of the drive finger 143, the first plate being immobile following the contact between the protuberance 124 of the first plate 12 and the fixed stop 146 of the first channel.

In parallel, a second return spring 16 is positioned between the first toothed wheel 14 and a fixed spring stop 18 positioned, for its part too, on the body 1 of the double distributor, in order to force the return of the first toothed wheel 14 toward an inactive position in which the first shutter 10 is fully open. This fully open position at rest makes it possible to ensure the safety of the engine of the vehicle by sending, in the case of a malfunction, cooled intake fluid into the cylinders, in particular if this malfunction of the actuating motor 9 occurs during a case of severe use of the engine of the vehicle.

Likewise, the device for controlling the second channel 4, presented here as the noncooled channel, comprises a second shutter 20, which can rotate about its shaft 21, of which the lower end is intended to rotate in the shaft support 8 of the body 1 of the distributor. The upper end, for its part, bears the second toothed wheel 24, to which it is fixed rigidly such that a rotation of this second toothed wheel triggers a rotation of the same amplitude of the shutter 20. A rotation of the actuating motor 9, of an amplitude such that the second toothed wheel 24 effects, under the action of the intermediate toothed wheel 32, a half-turn, opens and then recloses the second shutter 20, with a turning of the shutter and a change of its face which is opposed to the intake fluid in the fully closed position. Fixed stops 147, positioned on the body of the distributor, can be added to limit the rotation of the second toothed wheel beyond the fully closed positions and prevent the second shutter from passing beyond these positions and then causing leaks on the second channel when it is desired to shut it off. The device for controlling the second channel is completed by a device for measuring the angular position of the second toothed wheel and the second shutter 20. Such a device is conventionally formed by a magnet combined with a magnetic sensor, of the Hall-effect sensor type. The result of its measurement is transmitted to the computer ECU 103 which takes it into account in the setpoint which it gives to the actuating motor 9.

The device for controlling the shutters of the double distributor has been described by choosing the cooled channel as the first channel, that is to say the channel for which the shutter is subjected to the action of two return springs. It goes without saying that the first channel can be chosen as being the noncooled channel, the second channel then being the cooled channel, according to the desired management of the temperature of the intake fluid downstream of this double distributor.

Referring to FIGS. 5 and 6, there can be seen the movement law for the shutters, that is to say the relative change in the positioning of the two shutters, under the action of a control of the actuating motor of the double distributor and of the actuation of the drive kinematics for the two shutters 10 and 20. The axis of the abscissa corresponds to the travel of the actuating motor 9 from its neutral position, corresponding to the inactive position of the shutters, up to its full deflection. In these figures, the inactive position, that is to say that adopted by the shutters 10 and 20 in the case of a loss of their drive by the actuating motor 9, corresponds to the axis of the ordinates. With respect to the inactive position, the actuating motor is capable of driving the toothed wheels in a rotation of amplitude $2\alpha$, by sweeping over all of the desired positions for the shutters with the aid of a rotation in a single direction. They return to the inactive position, under the effect of the return springs 15 and 16, following a rotation of the actuating motor in the opposite direction. In this inactive position, the shutter 10 of the first channel 3 is opened, while the shutter of the second channel 4 is closed.

A rotation of the toothed wheels by an angle $\alpha$, represented by the branch A in the figures, both closes the shutter 10 of the first channel and opens the shutter 20 of the second channel, during a first phase of the movement law. The continuation of the rotation, by a second angle $\alpha$, represented by the branch B, closes the shutter 20 of the second channel, that 10 of the first channel remaining closed, during a second phase of the movement law.

FIG. 6 describes, on the one hand, the impact of these movements on the effective surface area of the distributor for the passage of the intake fluid in the two channels, and therefore on the distributed flow, and, on the other hand, the influence which they have on the temperature of the fluid as it enters the cylinders, downstream of the confluence of the two channels. The branch A thus corresponds to a regulation of the temperature of the fluid, without distributing its volume. Specifically, the kinematics for opening and closing the two shutters are represented here, without that being imperative, as compensating one another, thereby making it possible to obtain a constant flow at the outlet, for all the positions of the branch A. As for the branch B, it corresponds to a distribution of the flow on only the second channel and therefore here to a distribution of the flow on a fluid at the noncooled temperature. It is found that, according to the illustrated movement law, the channel on which the distribution takes place, that is to say the second channel, is also the closed channel in the inactive position.

Referring now to FIGS. 7 to 12, there will be described the operation of the kinematics of a double distributor according to the invention. FIGS. 7, 9 and 11 represent the position of the shutters of the two outlet channels in the end positions of the branches A and B of FIG. 5. FIG. 7 corresponds to the inactive position and FIGS. 9 and 11 correspond to rotations of the actuating motor by +α and +2α respectively. In FIGS. 9 and 11, the position of the shutters is represented twice, once in dotted line, which corresponds to the start of the corresponding branch A, respectively B, and once in solid line, which corresponds to its position at the end of said branch. FIGS. 8, 10 and 12 represent the position of the toothed wheels of the two channels and of their actuating members, upon completion of the same rotations.

In FIG. 8, the actuating motor 9 is in its neutral position, corresponding to an absence of action on the toothed wheels 14 and 24 which are in their inactive position, termed position 0 in the figure. The plate 12 is subjected to a torque in the counterclockwise direction by the first return spring 15 which maintains, by virtue of its prestress, the movable slot 123 of the plate 12 against the first drive finger 143. The second return spring 16 (not visible) is also in a prestressed position corresponding to the inactive position of the two toothed wheels 14 and 24.

In FIG. 10, the actuating motor 9 has carried out a rotation by an angle α (equal to 83° in the figure) with respect to FIG. 8. The first toothed wheel has carried out a rotation of the same amplitude, as has the plate 12 of which the movable stop 123 has followed the movement of the first finger 143, under the action of the prestress given to the first spring 15. The first shutter 10 has, consequently, turned by 83°, passing from the open position to the closed position. The second spring 16 has compressed under the rotation by 83° of the first toothed wheel to which it is fixed by one of its ends, its other end being fixed. This compression ensures that the first shutter returns toward the inactive position in the case of a loss or absence of a control by the actuating motor 9. In parallel, the second toothed wheel 24 has turned by the same angle α, driving the second shutter in the same rotation, thus passing from the fully closed position to the fully open position.

In FIG. 12, the actuating motor 9 has carried out, with respect to FIG. 10, a rotation by a second angle α, leading to an overall rotation by 2α from its neutral position. The first toothed wheel 14 has carried out, for its part too, a rotation by 2α while the plate 12 has carried out a rotation only by the value α. Specifically, said plate has remained immobilized in the position of FIG. 10, by the cooperation of its second movable stop 124 against the fixed stop 146 of the first channel. The rotation of the first toothed wheel 14 has been able to continue as a result of a notch 125 made on the circumference of the plate 12 which allows the passage of the drive finger 143 without interference with the plate. The first spring 15 has compressed, which will allow the return of the plate 12, and therefore of the first shutter 10, toward its inactive position when the actuating motor 9 is returned toward its neutral position. The second spring 16 has continued its compression, thus allowing the return of the two toothed wheels 14 and 24, which mesh with one another, toward the inactive position. Over the course of this branch B, the second shutter 20, which follows the rotation of the second toothed wheel, has passed from the fully open position to the fully closed position, while the first shutter 10 has, for its part, remained closed. The distribution of the flow of intake fluid on the second channel is thus obtained at a temperature which remains constant.

Referring now to FIGS. 13 to 15, there can be seen, in another representation, the kinematics put in place for implementing the diagrams of FIGS. 5 and 6. These figures describe, as above, the positions of the elements in the inactive position and at the ends of the two branches A and B.

The passage from FIG. 13 to FIG. 14, following a rotation of the actuating motor from 0° to α, shows the change in the position of the various elements on the branch A, which corresponds to a so-called proportional distribution of the intake fluid; specifically, all the points of the branch A correspond to a distribution in variable proportions of the fluid passing through the two channels. Between FIG. 13 and FIG. 14, the finger 143 of the first toothed wheel 14 turns by an angle α, which allows the plate 12 to turn by the same angle under the action of the first spring 15, and which, consequently, allows the first shutter 10 to close progressively. The first spring 15 does not compress and remains in a prestressed position. In parallel, the second toothed wheel 24, which is coupled to the first toothed wheel 14, turns by the same angle α and opens the second shutter 20. The second spring 16 compresses progressively while storing energy which will be able to return the two toothed wheels and the two shutters toward the inactive position. At the end of the branch A, the first shutter 10 is completely closed and the second shutter 20 completely open. As indicated above, the kinematics of the two shutters are, a priori, designed so as to maintain a constant flow for the whole of the two channels 3 and 4, for all the points of the branch A.

The passage from FIG. 14 to FIG. 15 shows the progression on the branch B, where the actuating motor passes from α to 2α, that is to say it corresponds to a progressive closure of the second shutter 20 of the second channel 4, that of the first channel remaining closed. It corresponds to a distribution of the intake fluid only on the second channel 4, by the rotation of the second toothed wheel, the first channel 3 remaining shut off by the first shutter 10. Between the two figures, the first toothed wheel 14 turns for its part too, but the plate 12 no longer turns, owing to the fact that it remains immobilized against the fixed stop 146 of the first channel. The first spring 15 is compressed on this branch owing to the rotation of the first toothed wheel while the plate 12 does not turn.

The second spring 16 continues its compression, owing to the fact that one of its ends is associated with the rotation of the two toothed wheels with respect to the body 1 and that the other end is immobilized by the fixed spring stop 18. The energy stored by these two springs will allow the two shutters to return toward the inactive position when the actuating motor 9 is returned to its neutral position or else in the case of a malfunction by the loss or absence of a control of the shutters. It will be noted that the closure of the second channel 4 by the second shutter takes place by a rotation of this second shutter by an angle 2α, close to 180°, with respect to the inactive position, which means that the second shutter has turned on itself from its fully closed situation in the inactive position, up to its position at the end of the branch B.

Overall, the kinematics of a double distributor according to the invention makes it possible, by the progressive rotation, in a single direction, of a single actuating motor, to simultaneously distribute the intake fluid on the two channels (branch A), by progressively modifying the distribution between the two channels, or to distribute it on a single channel (branch B). When one of the channels opens downstream of the distributor on a cooler 5 while the other runs around it before meeting up with the first channel at the confluence of the two channels, the double distributor makes it possible, by positioning the shutters on the branch A, to regulate the temperature of the intake fluid. In addition, by calibrating the opening and closing curve for the shutters as a function of the angle of rotation of the actuating motor, it is possible to maintain a constant overall flow during this proportional distribution and to act, in this branch, only on the final temperature of the fluid.

Moreover, the double distributor makes it possible, on the branch B, to distribute the intake fluid sent to the cylinders, at a constant temperature, which is termed hot or cold according to the channel on which the cooler 5 is installed. The possibilities offered by the distributor according to the invention are thus obtained by the actuation of a single electric motor, the actuation of which generates a rotational torque which acts only in a single direction to achieve the desired position. The return phase toward its initial position takes place without a torque other than that which makes it possible to overcome the frictional resistance to its rotation. The various elements of the kinematics return, for their part, in place under the action of the return springs 15 and 16. It is thus possible to produce the desired double distributor with the aid of a single and inexpensive electric motor.

It may also be noted that the distributor has been presented above as being situated upstream of the cooler and having one inlet and two outlets. In a variant, it may of course be situated downstream. It will then have two inlets and one outlet, the latter being in communication with the intake pipes of the engine.

The invention claimed is:

1. A double distributor for distributing the intake fluid of an internal combustion engine and controlling the temperature thereof, the distributor comprising:
    a body in which a first and a second channel for circulating said intake fluid are arranged, first and second shutters being respectively positioned in said channels in order to distribute the flow passing through said channels; and
    a motor for actuating said shutters and kinematics simultaneously actuating the first shutter and the second shutter according to a movement law in response to an actuation of said motor, said kinematics comprising an inactive position in which said shutters are positioned when no force is provided by said actuating motor,
    wherein said kinematics are configured such that said shutters can follow the whole of said movement law under the action of the motor from said inactive position without returning to said position.

2. The double distributor as claimed in claim 1, the first and the second shutter being rotatable.

3. The double distributor as claimed in claim 1, wherein the kinematics are configured to ensure, in response to a first control of the actuating motor, a proportional distribution on the two outlet channels by simultaneous rotation of the two shutters, an increase in the flow on one of the outlet channels being associated with a decrease in the flow on the other, during a first phase of said movement law.

4. The double distributor as claimed in claim 3, wherein the kinematics are configured to ensure a constant total flow during said proportional distribution.

5. The double distributor as claimed in claim 3, wherein the kinematics are configured to ensure, in response to a second control of the actuating motor consecutive to a closure of said first shutter and an opening of said second shutter resulting from said first control, the distribution of the flow passing through the second outlet channel by a rotation of the second shutter, the first shutter remaining closed, during a second phase of said movement law.

6. The double distributor as claimed in claim 5, wherein the kinematics are configured to bring the second shutter, in response to the second control, into a fully closed position corresponding to said shutter being reversed compared to its closed position when in the inactive position.

7. The double distributor as claimed in claim 5, wherein the kinematics are configured to position the shutters in opposition to the action of two return springs, a first spring remaining prestressed during the first phase of the movement law in order to transmit the force of the motor to a first of said shutters and being subjected to a stress, under the action of said motor, during the second phase of said movement law, the second spring being subjected to a stress, under the action of said motor, at least during the first of said movement law.

8. The double distributor as claimed in claim 7, wherein the actuating motor drives a first toothed wheel bearing a drive finger configured to rotate the first shutter, via said first return spring.

9. The double distributor as claimed in claim 8, wherein one of the ends of said first return spring is fixed to a first plate rigidly connected to the shaft of the corresponding shutter, the other end being fixed to said first toothed wheel.

10. The double distributor as claimed in claim 9, wherein the actuating motor drives, via a drive pinion, the first toothed wheel and a second toothed wheel meshing with one another, said first plate comprising a dead range in its cooperation with the drive finger and said dead range corresponding to the actuation of only the second shutter by the actuating motor, the first shutter remaining immobile.

11. An air intake module for an internal combustion engine comprising a double distributor as claimed in claim 1.

12. The module as claimed in claim 11, the first circulation channel of the distributor being connected to a cooler of the intake module while the second channel short-circuits this cooler.

\* \* \* \* \*